June 5, 1951  F. A. KANE, JR  2,555,591
PIPE COUPLING
Filed Aug. 20, 1946  2 Sheets-Sheet 1
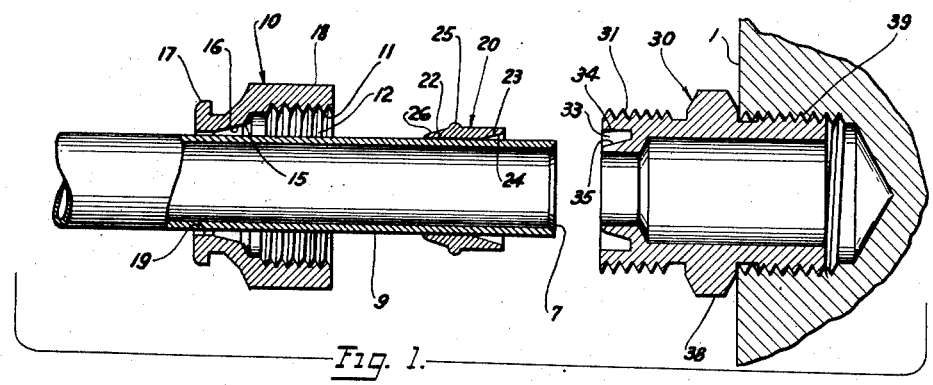
Fig. 1.
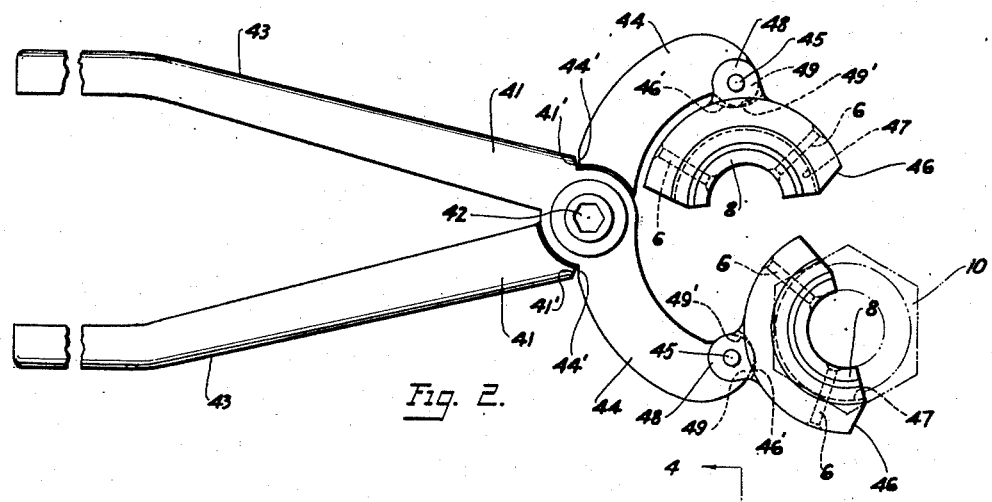
Fig. 2.
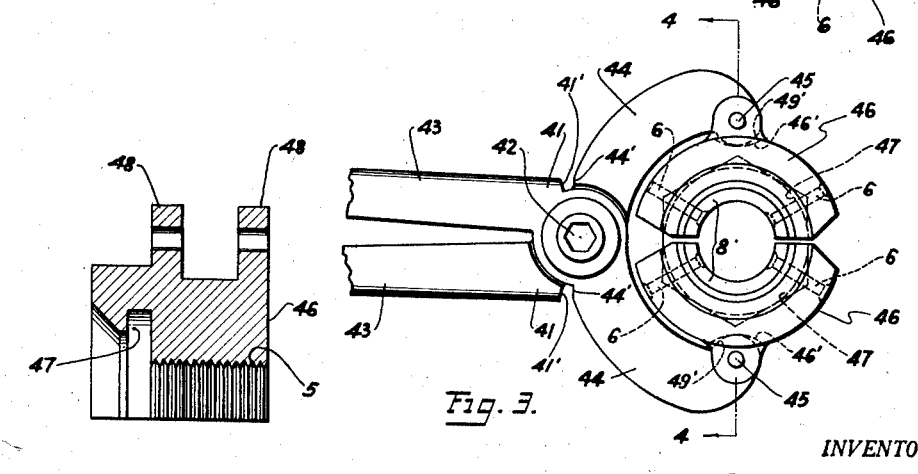
Fig. 3.
Fig. 5.
INVENTOR.
FRANK A. KANE JR.
BY
ATTORNEY June 5, 1951   F. A. KANE, JR   2,555,591
PIPE COUPLING
Filed Aug. 20, 1946   2 Sheets-Sheet 2

INVENTOR.
FRANK A. KANE JR.
BY
ATTORNEY

Patented June 5, 1951

2,555,591

UNITED STATES PATENT OFFICE 2,555,591

PIPE COUPLING

Frank A. Kane, Jr., Stratford, Conn.

Application August 20, 1946, Serial No. 691,729

2 Claims. (Cl. 285—122)

This invention relates to couplings for tubing, tubes or pipes (which for convenience will be herein generically referred to as "pipes") and a special tool used cooperatively with my novel pipe coupling.

In one of its aspects the novel pipe coupling and special tool of this invention relates to plastic pipes or tubes. The novel coupling is of the type which cooperates with a flare at the end of the pipe. In couplings of the type referred to and heretofore used for pipe of comparatively ductile or malleable material such as copper, brass, aluminum or other deformable metal, the end of the pipe to be connected is pre-flared before it is assembled with the coupling to form a fluid-tight seal. Couplings of the type referred to which requires the pipe to be pre-flared cannot be used for plastic tubing because of the difficulty encountered when it is attempted to pre-flare the ends of plastic tubing. Such tubing is too elastic to enable its end to be readily pre-flared, in that the flare immediately disappears and the tubing returns to normal as soon as the flaring tool is removed. Moreover, plastic tubes are subject to failure by fracturing when pre-flaring is attempted. If heat is applied to facilitate pre-flaring of plastic tubes, the walls of the flared end become non-uniform, resulting in an insecure and leaky seal in the coupling.

In this aspect of the invention, an important object is to provide a satisfactory coupling for plastic tubing. An allied object of the invention is to provide a novel coupling for plastic tubing which will not require pre-flaring. Another object is to provide a coupling for plastic tubing which will, in applying the coupling to the end of a plastic tube, cause the end to be flared and will associate the flared end permanently in the completed coupling joint. An allied object of the invention is to provide a special tool which is cooperatively used with the novel coupling for applying the coupling to plastic tubing in a manner to cause the end of the tubing to be flared and the flared end to become associated with the coupling to form a secure, fluid-tight seal.

In another aspect of the invention, the aforedescribed novel coupling and special tool which cooperate to flare the end of a pipe and form a tight seal or joint with the coupling, are adapted for use with comparatively ductile or malleable material such as copper, brass, aluminum or other deformable metal (which will be herein referred to as "metal pipe" to distinguish from plastic tubing or pipe). Accordingly, an important object of the invention is to provide a novel coupling for metal pipe which will not require pre-flaring. The improved coupling thus eliminates the separate operation heretofore required in pre-flaring. This advantageous is of considerable significance where the coupling is to be made in cramped quarters where it would be awkward or difficult to pre-flare the pipe, especially if of large size.

An allied object is to provide a novel coupling, and a special tool cooperatively used therewith, for flaring the end of a metal pipe in applying the coupling thereto and associating the flared end therewith in a secure, fluid-tight seal. In this connection it might be pointed out that the pipe is flared in the novel coupling and by the special tool more uniformly than when the pipe is first pre-flared and then associated and sealed in the coupling.

For the attainment of the foregoing and such other objects as may appear or be pointed out I have shown several modifications of my invention in the accompanying drawings, wherein Figure 1 is a sectional view of the improved coupling, the component parts being separated but shown in their cooperative relation;

Figure 2 is a front view of the special tool in open position with the lower jaw turned outwardly;

Figure 3 is a front view of the special tool in clamping position;

Figure 5 is a section through a jaw modified for metal pipe;

Figure 7:
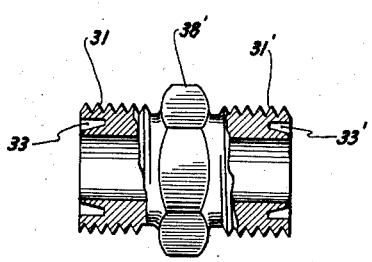
Figure 6:
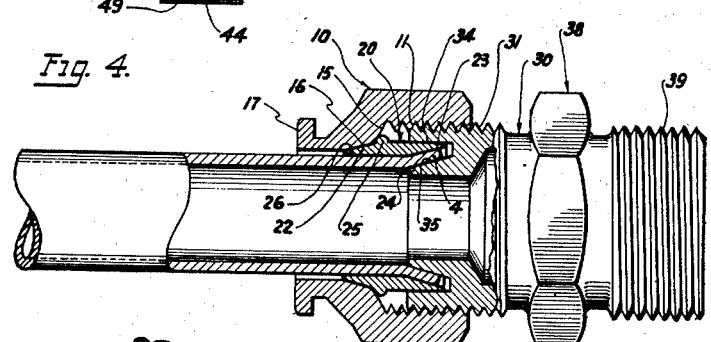
Figure 8:
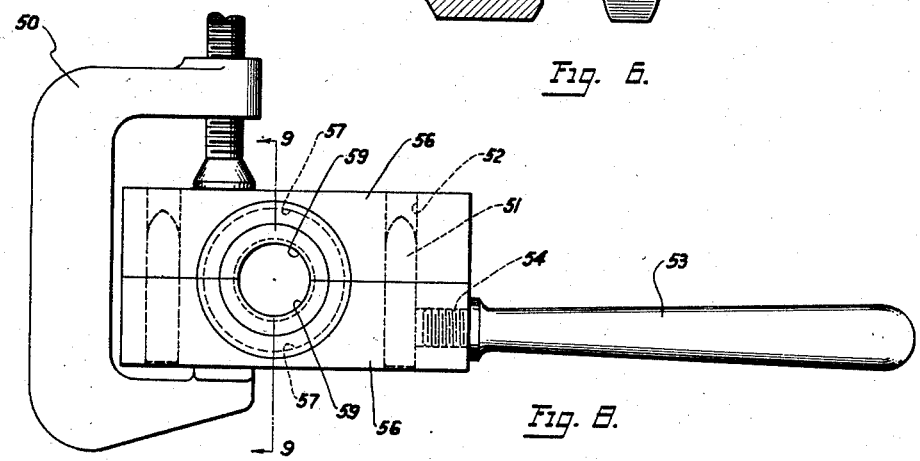
Figure 9:
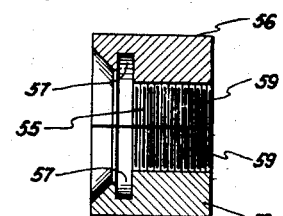

Figure 6, partially in section, shows the component parts of the coupling and the pipe in final, sealed relationship;

Figure 7, partly sectioned, illustrates a connector symmetrical about its central transverse plane, for coupling two lengths of pipe;

Figure 8 is a front view of a modified form of special tool better suited for large size pipe; and Figure 9 is a section on the line 9—9 of Figure 8.

The novel coupling comprises three component parts, viz., a nut 10, a sleeve 20, and a connector 30. The end of connector 30 which faces the nut 10 is externally threaded at 31 for engagement with internal threads 11 of the nut. The other end of connector 30 is shown in Figure 1 with external threads 39 for screwing into a surface 1 which may be the wall of a tank, a fitting or the like. So far as the invention is concerned, connector 30 may be integral with surface 1, or it may be provided with internal threads or be connected in any manner with the fitting, pipe or fixture to be coupled. Between its threaded ends, 31, 39, connector 30 may be provided with planar surfaces 38, shown hexagonal in Figure 6, for application of a wrench. Nut 10 is likewise provided with planar surfaces 18, shown hexagonal in Figure 4, for the same purpose. The pipe 9 to be joined to the coupling is inserted through opening 19 of nut 10 and the sleeve 20 slipped on the inserted end of the pipe.

The inserted end of pipe 9 is not pre-flared;

as explained in the statement of invention, the pipe is flared as part of the operations, hereinafter described in detail, in sealing the pipe to the coupling. However, to facilitate the flaring operation, the inserted end of pipe 9 is beveled or chamfered at its end, indicated at 7, by a pipe reamer, tapered scraper or the like. After the component parts of the coupling and the chamfered pipe are assembled as shown in Figure 1, a tool, Figure 2, is applied to the nut 10 and to the pipe 9. This tool is formed principally of two symmetrical levers 41, 41 pivoted together at 42, each of the levers having a long shank 43 and a shorter arcuately curved portion 44. At the distal ends of curved portions 44, 44 of the levers are pivotly mounted, at 45, a semi-circular vise or shoe 46. The two semi-circular shoes 46, 46 match together, as shown in Figure 3, to form an annular ring. It was stated above that the tool is applied to both the nut 10 and to the pipe 9. The tool is applied to the nut 10 in a manner to permit the nut to be turned relatively to the tool and to the pipe and at the same time preventing axial or longitudinal movement of the nut relative to the tool. The tool is applied to the pipe 9 in a manner to prevent turning or axial movement of the pipe relative to the tool; in other words, the tool makes clamping engagement with the pipe.

Figure 4:
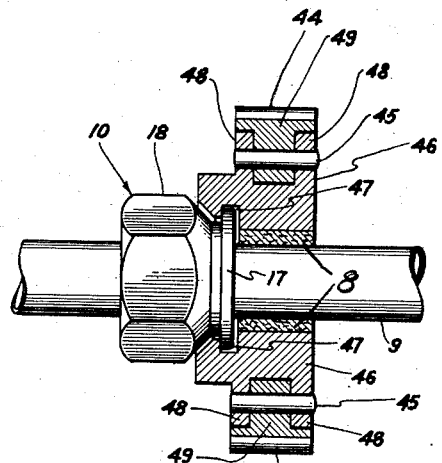
Figure 4 is a section taken on the line 4—4 of Figure 3.

In order that the nut 10 may be held in the tool for rotational and non-axial movement relative to tool, nut 10 is provided at one end with an annular flange 17 and the shoes 46, 46 of the tool are provided with a semi-circular groove, 47, 47, see Figure 4. When the shoes 46, 46 are matched as in Figure 3, the semi-circular grooves 47, 47 match to form an annular groove. The grooves 47, 47 are dimensioned relatively to the annular flange 17 of nut 10, see Figure 4, so that the flange will not be confined by the groove, either peripherally or laterally, when the levers of the tool are forced together in closed position, Figure 3. Hence nut 10 can be freely turned relatively to the tool, but has only sufficient axial or longitudinal movement as may be required for lateral clearance of the flange 17 in annular groove 47.

The half shoes 46, 46 are provided with means for clamping the pipe 9, which means are preferably different in the case of plastic tubing and in the case of metal pipe. The tool shown in Figures 2, 3, and 4 is particularly adapted for plastic tubes, in which case the clamping means comprises a pair of semi-circular strips of leather, rubber or similar pliable material 8, 8, which are secured to the respective vises or shoes 46, 46, as by rivets 6. The strips 8, 8 encircle the plastic pipe when the tool vises are closed, as in Figure 3, and the shanks 43 of the levers 41, 41 are squeezed together, to exert a frictional grip on the pipe. Contacting surfaces of rubber, leather or other pliable material is preferred in the case of plastic tubing because of the danger of fracture or marring the surface or distorting the tube.

In the case of the metal pipe, the vise shoes 46, 46 would be provided with threads 5, Figure 5, or other sharp indentations which will be effective to grip into the hard surface of the metal. Threads or other sharp indentations in the metal surface of the vise shoes could not be used in the case of plastic tubing because such hard, sharp projections would not grip the tubing but would simply cut into the soft plastic surface.

Recurring to the description of the method of making the novel coupling joint, the tool is applied to nut 10 in the manner explained above. The component parts of the coupling are widely separated in Figure 1 for facility in illustration; it will be clear that the tool is not applied until the parts are brought closer together, i. e., with external threads 31 of connector 30 at the point of entering internal threads 11 of nut 10 or even after the connector and nut are in threaded engagement. In this position of the connector 30 and nut 10, sleeve 20 is interposed between the two with the rear portion (leftward, Figure 1) 22 of the sleeve received in the annular cavity 12 of nut 10 and with its forward end 23 oppose an annular recess 33 in the left transverse end of connector 30. In the said position of the parts, the forward, chamfered end 7 of the pipe is likewise opposed to the annular recess 33 of the connector.

The said annular recess 33 of connector 30 has a cylindrical outer surface 34 and an inner conical surface 35, so that 33 is an annular conical recess. After nut 10 and connector 30 are brought into threaded engagement, the pipe 9 is pushed forward (to the right, Figure 1) by hand until its chamfered end 7 abuts against the inner conical surface 35. The tool is then squeezed tightly to firmly grip the pipe 9 and the nut 10 threaded onto connector 30, by applying a wrench to its planar surface 18. Inasmuch as the pipe 9 is firmly gripped by the tool, the advancement of nut 10 to the right as it is being screwed onto the connector causes both the tool and the pipe to advance rightwardly. Considerable force is in this manner applied to the pipe to cause its chamfered end to enter the annular conical recess 33 of the connector, the wall of the pipe being spread outwardly by the inner conical surface 35 to form a flare 4, Figure 6.

During this forward movement of the pipe, the sleeve 20 is likewise moved forwardly by the nut 10. For this purpose the rear end portion 22 of the sleeve has an outer tapered surface 26 which is abutted by an internal conical surface 16 of nut 10, as shown in Figure 6, to cause the sleeve to move rightwardly as the nut is advanced in that direction. In addition, sleeve 20 has an annular projection or rib 25 which is abutted by annular shoulder 15 of nut 10, to provide a positive driving connection between nut 10 and sleeve 20 to supplement the frictional driving connection between tapered surfaces 16 and 26.

The forward end 23 of sleeve 20 has an inner tapered surface 24 so that an annular conical recess is provided between forward end 23 of the sleeve 20 and the pipe 9, for the flare 4 of the pipe, as shown in Figure 6. In this figure, which shows the coupling and pipe fully made up in a tight seal or joint, it will be noted that flare 4 and the forward, tapered end 23 of the sleeve are both received within the annular conical recess 33, see Figure 1, of the connector 30 with the inner surface of flare 4 abutting the inner conical surface 35, with the outer surface of flare 4 and the inner tapered surface 24 of sleeve 20 in abutting relation, and with the outer cylindrical surface of the sleeve and the inner cylindrical surface 34 of the annular conical recess in abutting relation.

A single connector may be used in a form of the novel coupling for directly coupling two pipes together. Such a connector, which may be referred to as "duplex," is shown in Figure 7 and is symmetrical about the central planar portion 38' so as to present threaded portions 31, 31' at both sides thereof for screwing engagement with nuts 10, and annular conical recesses 33, 33' against which abut the chamfered ends of the two pipes to be coupled together. The two ends of the duplex connector of Figure 7 are shown having identical diametrical dimensions, as this connector is intended for coupling two pipes of the same size; the ends of the duplex connector may be made so that one end will accommodate a pipe of a given size while the other end takes a different size pipe.

The novel coupling when used for plastic tubing may be made of any suitable metal. It should be noted that the metal sleeve 20 further serves to protect the weaker plastic tube. Where the plastic tubing is used for conveying fluid (liquid or gas) which is corrosive to metal, the coupling may be made of plastic. Or the connector 30, which is the only part of the coupling in contact with the conveyed fluid, alone may be made of plastic and the sleeve 20 and nut 10 fabricated of metal.

In making up the novel coupling joint, the special tool is held in one hand and a wrench applied by the other hand to the nut 10 to thread it onto connector 30, as already described. If necessary, connector 30 may be held in a vise or held by a wrench applied to its planar surface 38. To facilitate the manipulation of the special tool by one hand operation, the tool is designed so that its shanks 43, 43 need be spread apart a limited extent in applying it to the nut 10. That is, by reason of the limited opening of its shanks, it can be readily opened by the fingers of one hand. The tool may be applied to nut 10 when opened to this limited extent, by reason of the pivoting of its half shoes 46, 46. One of the vise shoes, the lower one in Figure 2, is turned outwardly, as shown, to enable the nut 10 to be received therein with its annular flange 17 seating in the arcuate groove 47 of the vise shoe. The shoe is then turned inwardly, or the tool itself turned relatively to the shoe, to bring the vises 46, 46 in closed relation, as shown in Figure 3. The opening of the tool is limited by the abutment of a flat surface 41', Figure 2, on the lever 41, near its pivotal point 42, with a flat surface 44' on the curved arm 44 of the other lever near the pivotal point 42. Only one of the vises or shoes 46, 46 need be pivotally mounted. However, it is more convenient to pivot both shoes so that the tool may be universally applied, i. e., from either side. It is more convenient that the lower shoe be turned outwardly (to receive the nut 10, as explained above) since that may be done with the aid of gravity.

The shoes 46, 46 are provided with a pair of apertured ears 48, 48 between which is received a central lug 49 projecting from the ends of the curved arms 44, 44 of the levers, which is likewise apertured to receive pivot pin or bolt 45. The end of central lug 49 is rounded at 49', Figure 2, and the vise shoe 46 is provided, between its said ears 48, 48, with a rounded cavity 46' for the round end 49' of central lug 49. The pin or bolt 45 does not fit tightly in the aligned apertures of spaced ears 48 and central lug 48, so that there is a limited extent of loose play. The purpose of this and the aforedescribed rounded end 49' of lug 49 and its reception is rounded cavity 46' of shoe 46, is to enable the pressure exerted by the levers to be conveyed by the central lugs 49, 49 directly to the vise shoes 46, 46, and not through the pivot bolt 45.

The vise shoes are removable, at pivot bolt 45, so that different pairs of shoes may be interchangeably applied to the same tool for different size pipe. For example, one tool may accommodate vise shoes for pipe ranging from ⅛" to 1". For pipes larger than 1" the block tool shown in Figures 8 and 9 may be found more convenient. This comprises a pair of half blocks 56, 56, each of which has a semi-circular opening 59 to receive the pipe and a semi-circular annular groove 57 to receive the annular flange 17 of nut 10, Figure 1, which openings 59, 59 and grooves 57, 57 match to form a circular opening and an annular groove. The pipe opening is shown in Figures 8 and 9 as having threads 55 for gripping metal pipe, as explained above with special reference to Figure 5; where the block is to be used for plastic pipe, rubber or leather facing strips would be used as described above in connection with strips 8, 8 of Figures 2–4. The two half blocks 56, 56 are held in matched relationship by dowel pins 51 on one block which fit in holes 52 in the other block. The two halves are held tightly together by a clamp 50 and the device is held against turning (during the threading of nut 10, as described above) by a handle 53, one end of which is threaded to be received in a selected one of a plurality of tapped holes 54 provided, for convenience, in one or both sides of the half blocks 56.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except in so far as such limitations are specified in the appended claims.

I claim:

1. In a coupling device for pipe of the type having a connector member and a securing member in coactive threaded engagement and a sleeve disposed over the pipe, and wherein the securing member is in pressing engagement with the sleeve to hold the sleeve and forward end of the pipe disposed in pressing engagement within an annular recess in the connector member, and wherein the pipe and the securing member are adapted for coactive engagement with a temporary holding member, a receiving portion on the said securing member for the said temporary holding member having a recessed portion disposed rearwardly of the forward end of the securing member, whereby the holding member may be simultaneously applied to said receiving portion and to a portion of the pipe at the rear of the securing member to prevent relative axial movement between the securing member and the pipe.

2. A coupling device for pipe according to claim 1, further provided with an annular flange adjacent the said recessed portion and disposed rearwardly thereof.

FRANK A. KANE, Jr.

REFERENCES CITED

The following references are of record in the file of this patent:

UNITED STATES PATENTS

| Number | Name | Date |
|---|---|---|
| 1,790,025 | Schnaier | Jan. 27, 1931 |
| 1,823,061 | Pearson | Sept. 15, 1931 |
| 2,026,168 | Guarnaschelli | Dec. 31, 1935 |
| 2,112,239 | Guarnaschelli | Mar. 29, 1938 |
| 2,349,081 | Douglass | May 16, 1944 |
| 2,399,312 | Augustine | Apr. 30, 1946 |